United States Patent [19]

Poage

[11] 4,207,679
[45] Jun. 17, 1980

[54] MICROMETER

[75] Inventor: Melvin L. Poage, St. James, Minn.

[73] Assignee: Scherr-Tumico, Inc., St. James, Minn.

[21] Appl. No.: 939,805

[22] Filed: Sep. 5, 1978

[51] Int. Cl.² ............................................. G01B 3/18
[52] U.S. Cl. ...................................................... 33/166
[58] Field of Search ................. 33/166, 164 R, 164 B, 33/164 C, 164 D, 165, 163, 170, 154 R, 154 B, 154 C, 154 E, 154 F, 159, 167

[56] References Cited

U.S. PATENT DOCUMENTS

| 2,461,995 | 2/1949 | Modes | 33/166 |
| 2,560,850 | 7/1951 | Day | 33/166 |
| 2,585,631 | 2/1952 | Crownover et al. | 33/166 |
| 3,877,149 | 4/1975 | Masuda | 33/166 |
| 3,971,137 | 7/1976 | Fernandez | 33/164 R |

OTHER PUBLICATIONS

Postcard advertisement for "New *Thomson* Ball--Groove Shaft TM Super Ball Bushing ® Combination".

*Primary Examiner*—Willis Little
*Attorney, Agent, or Firm*—James R. Haller

[57] ABSTRACT

A micrometer having a bushing and a measuring spindle extending through the bushing, the spindle and bushing having confronting surfaces and including means permitting movement of the spindle with respect to the bushing in a single direction and for preventing relative movement of the spindle and bushing in other directions. A bearing having a spheroidal surface protrudes from one of the confronting surfaces with the spheroidal surface in contact with walls of a groove formed in the other confronting surface, the groove extending in the single desired direction. Means are provided to resiliently urge the bearing into the groove and to permit resilient radial movement of the bearing with respect to the spindle while maintaining contact of the spheroidal surface of bearing with walls of the groove.

17 Claims, 18 Drawing Figures

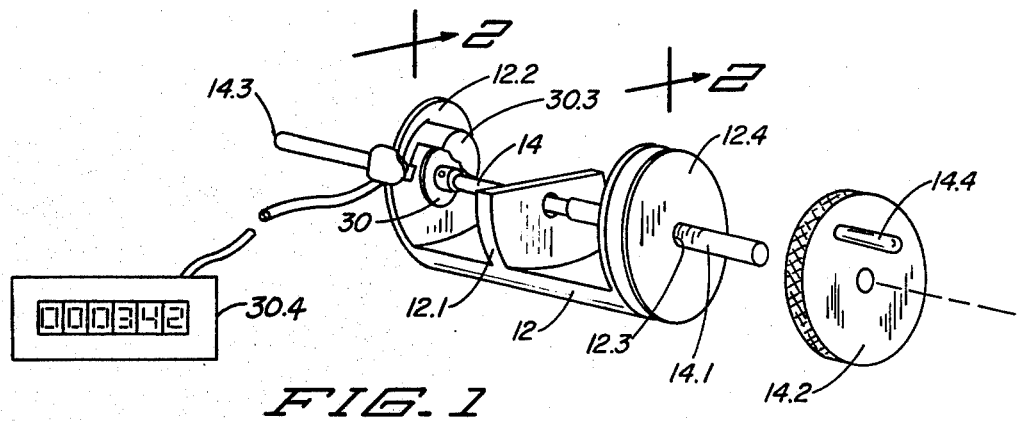
FIG. 1
FIG. 2
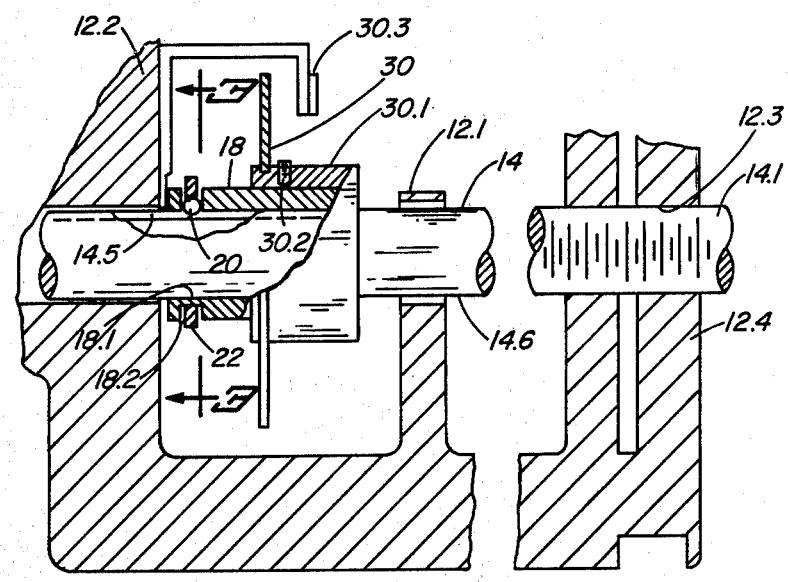
FIG. 3
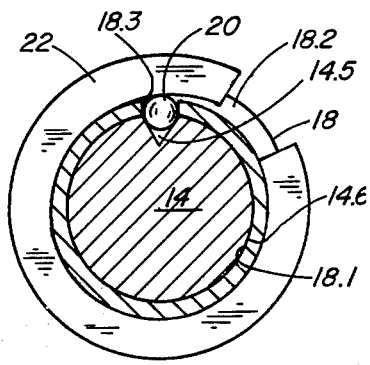
FIG. 4
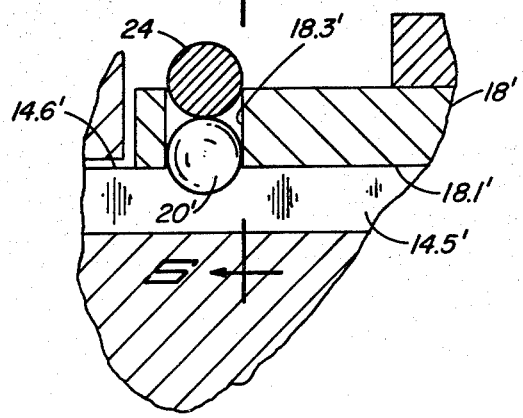
FIG. 5
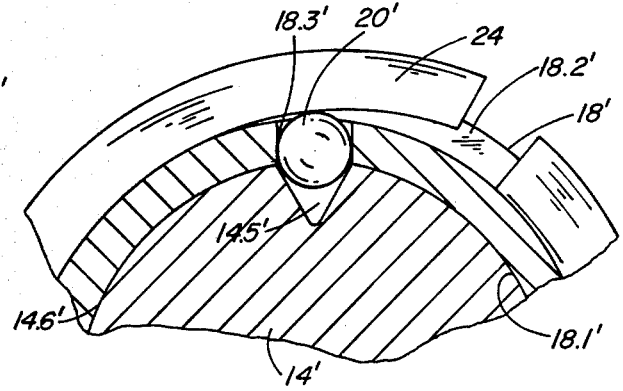

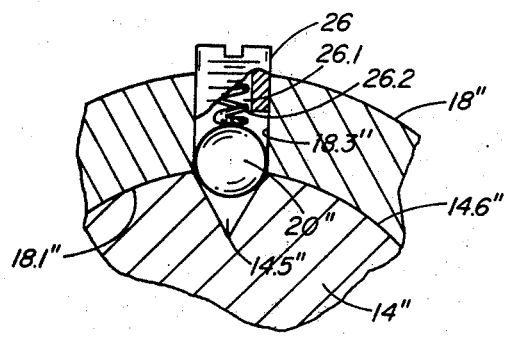
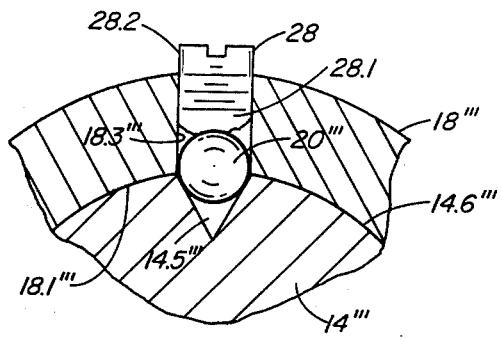
FIG.6        FIG.7
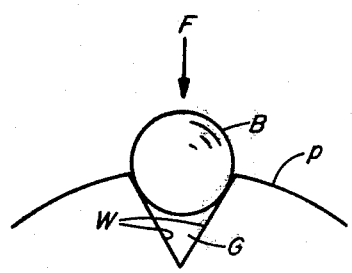
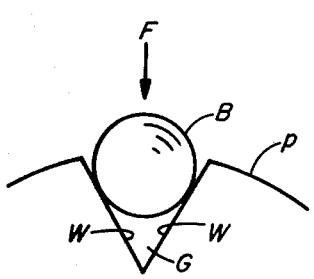
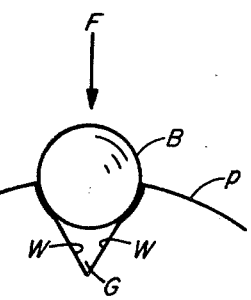
FIG.8   FIG.9   FIG.10
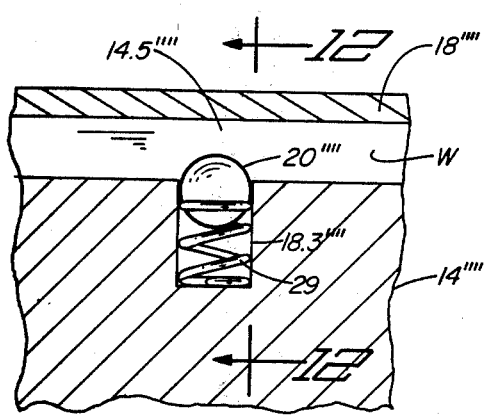
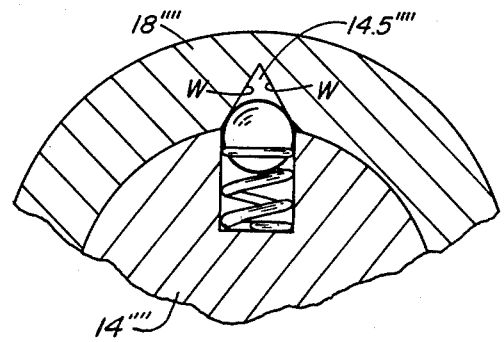
FIG.11        FIG.12

MICROMETER

BACKGROUND OF THE INVENTION

Micrometers of the type employed by machinists, quality control persons and the like ordinarily include a measuring spindle, the end of which is brought into contact with a work piece. Readout means, often using circumferential vernier scales or digital readout devices, are provided to measure the axial movement of the spindle. For example, the spindle may be threaded so that rotation of the spindle causes the spindle to advance axially with respect to a micrometer frame. In another embodiment, the spindle is moved axially but does not itself rotate. In the latter embodiment, rotation of an interiorly threaded barrel affixed to the frame may operate to advance axially an exteriorly threaded spindle, rotation of the barrel indicating the distance advanced axially by the spindle.

The spindle is slideably received within a bushing which in turn is attached to the frame (or the spindle at least is prevented from axial movement with respect to the frame). For example, the digital readout micrometer referred to above may employ a bushing which is fixed to the spindle against relative rotation but through which the spindle may axially slide. The bushing is maintained stationary axially with respect to the frame. The spindle may bear an encoder wheel, rotation of which is detected by a stationary encoder mounted to the frame, the encoder delivering electric signals representative of the rotation of the encoder wheel (and hence also representative of axial movement of the spindle) for digital readout. In a similar embodiment, the bushing may bear a gear having teeth mechanically meshing with teeth of a mechanical readout device. In each of these situations, it is necessary that the encoder wheel, or gear, remain stationary from an axial standpoint with respect to the frame of the micrometer, and it is further necessary that the encoder wheel or gear be rigidly coupled or fixed to the micrometer spindle as the latter is rotated to advance it axially with respect to the frame.

In the embodiment referred to above in which the spindle does not itself rotate with respect to the frame, means may be provided to fix the spindle to a frame-mounted bushing to prevent relative rotation between the spindle and bushing while yet permitting the spindle to slide axially relatively freely and smoothly through the bushing.

Each of the embodiments referred to above requires that the spindle be substantially tightly coupled to the bushing against relative motion or movement therebetween in one direction (e.g., rotation), but that free movement of the spindle within the bushing be permitted in another direction (e.g., axially of the spindle).

One prior effort to provide the needed structure employed a set screw extending radially through the bushing, the inward end of the screw tapering to a point with the conical surface of the screw point riding in a V-shaped groove provided axially in the outer surface of the spindle. The operation of micrometers of this type is highly dependent upon the uniformity of the groove formed in the spindle, since the groove and set screw must provide for essentially no freedom of rotational movement between the spindle and bushing. Even minor irregularities in the configuration of the groove, accordingly, cannot be tolerated. The close fit which is thus required between the inner end of the set screw and the groove, however, presents other problems. For example, continued use of the micrometer will cause the end of the screw to wear, and hence continued, precise adjustment of the screw is necessary. Further, and perhaps of greater importance, slight imperfections in the spindle groove, or small particles of foreign matter in the groove, may cause the closely fitting set screw head to bind in the groove, thereby causing rotation and axial advancement of the spindle to be abruptly halted. Considerable rotational momentum is often developed as the spindle is rapidly advanced toward, for example, the surface of a work piece, and the abrupt stoppage of movement of the spindle may not only damage the set screw head, but may cause considerable damage to associated gears and readout devices which are mechanically coupled to the spindle.

SUMMARY OF THE INVENTION

The instant invention relates to a micrometer incorporating means for permitting the micrometer spindle to move smoothly in one direction within a bushing but preventing relative movement between the spindle and bushing in other directions.

Broadly speaking, the spindle and bushing of a micrometer of the invention are provided with mutually confronting surfaces of which one includes a spherical surface-receiving groove, desirably generally V-shaped in cross-section. A bearing having an exposed spheroidal surface protrudes from the other confronting surface into the groove and into contact with the groove walls. Means are provided to resiliently urge the spheroidal bearing surface into the groove and to permit resilient radial movement of the bearing with respect to the spindle while maintaining contact of the spheroidal bearing surface with the groove walls. Means are provided to restrain axial or rotational movement of the bearing with respect to the surface from which it protrudes. As a result, the bearing may easily move within the groove as the spindle is moved in one direction with respect to the bushing, the bearing moving inwardly or outwardly slightly of the groove as groove imperfections or foreign particles in the groove are encountered.

In a preferred embodiment, the generally V-shaped groove is formed in the outer surface of the spindle and extends in an axial direction. The bushing desirably is provided with a radially extending orifice within which is closely retained a spherical or spheroidal bearing. A resilient metal retaining ring or other resilient means is carried by the bushing and presses resiliently radially inwardly upon the bearing to insure contact of the latter with walls of the groove.

DESCRIPTION OF THE DRAWING

FIG. 1 is a perspective view partially exploded, of a digital readout micrometer employing the instant invention;

FIG. 2 is a broken-away cross-sectional view taken generally along line 2—2 of FIG. 1;

FIG. 3 is a cross-sectional view taken along line 3—3 of FIG. 2;

FIGS. 4 and 5 are broken-away, cross-sectional views similar to FIGS. 2 and 3 but showing a modified embodiment of the invention;

FIG. 6 and 7 are broken-away, cross-sectional views similar to the views in FIGS. 3 and 5, but showing modified embodiments of the invention;

FIGS. 8, 9 and 10 are schematic views showing the relationship of certain elements of an embodiment of the invention;

FIG. 11 is a broken-away, cross-sectional view of a modified embodiment of the invention;

FIG. 12 is a broken-away view, in partial cross-section, taken along line 12—12 of FIG. 11;

DETAILED DESCRIPTION

Figure 13:
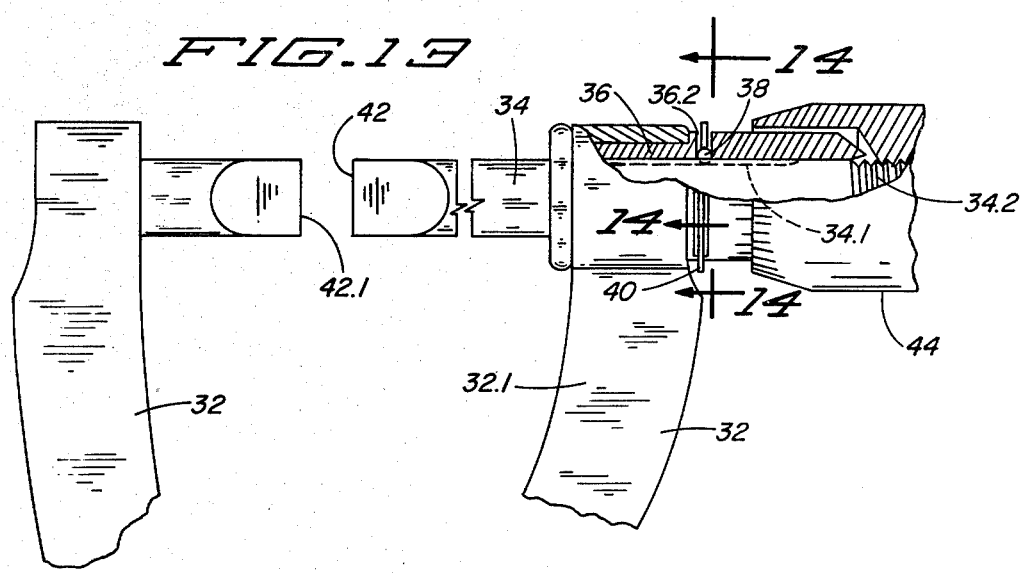
FIG. 13 is a broken-away view in partial cross-section, of another embodiment of the invention.

With reference to FIG. 1, a micrometer of the invention 10 is depicted without its cover for purposes of clarity. The micrometer includes a frame 12 having an upstanding center section 12.1, upstanding end supports 12.2, 12.4 and a spindle 14 extending through the upstanding supports. The spindle is threaded at one end, as shown at 14.1 (FIG. 2) and threadingly engages an internally threaded hole 12.3 in one of the upstanding end supports. A rotatable barrel 14.2 is fixed to that end of the spindle which protrudes through the threaded end support. The other end 14.3 of the spindle is provided with a hardened work-contacting surface. It will be understood that as the barrel 14.2 is rotated (as with the help of the crank 14.4), the spindle will rotate about its axis and will move axially (that is, parallel to its axis of rotation) with respect to the frame to bring the work-contacting end 14.3 of the spindle into contact with a work piece. The general structure of the micrometer thus described is known to the art, and need not be described in greater detail.

With reference to FIGS. 2 and 3, the spindle 14 is provided with a spheroidal bearing-receiving groove 14.5, desirably generally V-shaped, in its outer surface, the groove extending axially, that is, in a direction parallel to the axis of rotation of the spindle. A generally cylindrical bushing 18 is provided with a bore defining an inner surface 18.1 confronting the exterior surface 14.6 of the spindle, the confronting surfaces of the bushing and spindle being generally in sliding contact to permit the spindle to slide within the bushing but preventing loose or wobbling motion of the spindle within the housing. A circumferential slot 18.2 is provided in the outer surface of the bushing to receive a snap-ring or the like (which will be later described), and from within the slot a hole extends through the remainder of the wall thickness of the bushing radially of the axis of rotation of the spindle, the hole being designated 18.3 in FIG. 3. A small, spheroidal bearing 20, such as a steel, brass or tungsten carbide ball bearing, is carried in the hole 18.3 and protrudes inwardly into contact with the walls defining the V-shaped groove 14.5 of the spindle. The dimensions of the bearing 20 and of the groove 14.5 are such that the walls of the groove are tangent to the spheroidal surface of the bearing. The diameter of the hole 18.3 is selected so that the bearing 20 is closely constrained to radial movement within the hole.

Resilient means, illustrated as snap-ring 22 in FIGS. 2 and 3, is employed to urge the bearing 20 radially inwardly of the spindle to continually maintain contact between the spheroidal bearing surface and the walls of the groove 14.5.

The snap-ring 22 of FIGS. 2 and 3 may be made of spring steel and may have a generally rectangular cross-section, as shown in FIG. 2. The snap-ring is carried in and retained by the slot 18.2 in the bushing, the inner surface of the snap-ring adjacent one end bearing resiliently radially inwardly against that portion of the bearing which extends outwardly through the hole 18.3.

Referring again to FIGS. 1 and 2 of the drawing, an encoder wheel 30, which may be of glass, is mounted to the bushing 18 by means of a sleeve 30.1, the sleeve being rigidly attached to the bushing by means of a set screw 30.2. The encoder wheel 30 is thus rigidly coupled, through the bearing 20 and slot 14.5, to the spindle 14 against relative rotation between the wheel and spindle. Rigidly carried by the frame 12 of the micrometer is a detector 30.3 which detects very small increments of rotation of the encoder wheel 30, all in a manner known to the art and hence requiring no further detailed description. Signals generated by the detector 30.3 in response to rotation of the encoder wheel 30 are led to a known digital readout device shown schematically as 30.4 in FIG. 1. It will be understood that accurate operation of the micrometer of FIG. 1 requires the encoder wheel 30 to be rigidly fixed to the spindle so that any rotation of the spindle is transmitted to the encoder wheel. It is also necessary that the encoder wheel be restrained from movement axially of the detector 30.3. These requirements are satisfied easily and readily by the instant invention in that the spheroidal bearing 20 slides or rolls easily in an axial direction along the groove 14.5 in the spindle, but rigidly prevents any rotary motion between the bushing 18 (and encoder wheel 30) and the spindle.

The embodiment of FIGS. 4 and 5 differs from that of FIGS. 2 and 3 only in that a snap-ring 24 having a circular cross-section is employed to urge the bearing into the V-shaped groove. Primed numbers have been used in FIGS. 4 and 5 to designate elements which are the same as those in FIGS. 2 and 3.

FIG. 6 shows another embodiment of the invention, and double primed numbers have been used to designate elements which are the same as those shown in FIG. 3. FIG. 6 shows the resilient means in the form of a set screw 26 which is threadingly received in the hole 18.3". The set screw has a recessed interior 26.1 carrying a helical compression spring 26.2, the lower end of the spring contacting the surface of the spheroidal bearing 20" and urging the same radially inwardly of the spindle 14" into contact with the walls of the groove 14.5". The thickness of the walls of the bushing 18" may be adjusted so as to accomodate both the spheroidal bearing 20" and the set screw 26.

FIG. 7 shows yet another embodiment of the invention described above with reference to FIG. 3, the resilient means in FIG. 7 taking the form of a set screw 28 having a resilient lower end 28.1 in contact with the spheroidal bearing 20". Triple primed numbers designate elements in FIG. 7 which are the same as those shown in FIG. 3 and FIG. 6. As with the embodiment of FIG. 6, the set screw 28 in FIG. 7 is threadingly received in the hole 18.3". The set screw 28 may be formed, for example, of "dual durometer" polyvinylchloride, the threaded surface of the screw and its slotted, exposed end 28.2 being formed of a relatively hard polymer and the bearingcontacting end of the screw being of a softer, resilient polymer. Various other embodiments of means for resiliently urging the spheroidal bearing into the slot of the spindle will be evident to those skilled in the art. For example, the snap-ring 22 of FIGS. 2 and 3 may be replaced with a rubber "O" ring received within the slot 18.2 As another example, the set screws shown in FIGS. 6 and 7 may be replaced with resilient polymeric plugs of, for example, silicone rubber.

FIGS. 11 and 12, in which quadruple prime numbers indicate previously described similar elements, show an embodiment of the invention in which the groove is formed in the inner surface of the bushing 14'''', and the spheroidal bearing 20'''' is carried in a radially extending cylindrical recess or hole 18.3'''' formed in the spindle. Resilient means, in the form of a helical compression spring 29, is seated in the hole 18.3'''' and urges the bearing 20'''' radially outwardly and into contact with the walls "W" of the V-shaped groove 14.5'''' formed in the bushing, thereby preventing relative rotation between the bushing and spindle but permitting axial movement of the spindle with respect to the bushing. In comparison to the embodiment in which the groove is formed in the spindle and the bearing is carried by the bushing, the embodiment of FIGS. 11 and 12 tends to protect the groove from becoming nicked or scratched through normal use of the micrometer. However, the range of axial movement permitted the spindle is reduced, since the bushing is ordinarily considerably shorter in axial measurement than the spindle.

Figure 14:
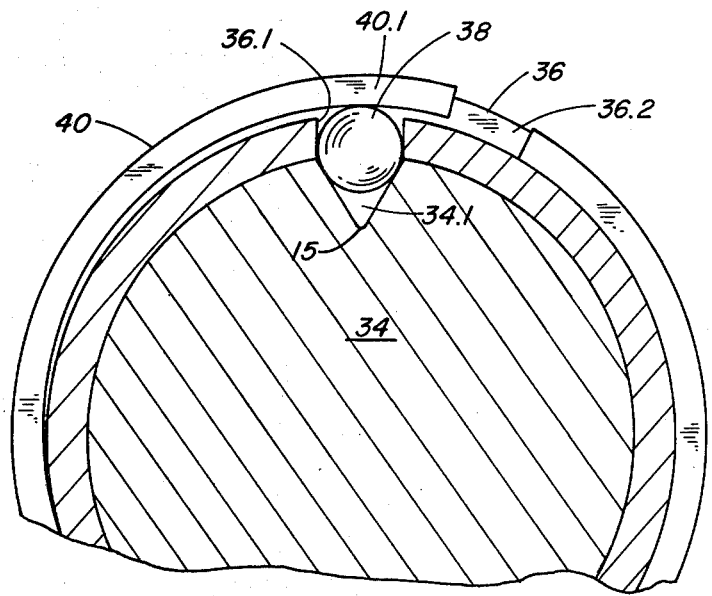
FIG. 14 is a broken-away, cross-sectional view taken along line 14—14 of FIG. 13.

FIGS. 13 and 14 depict a micrometer of the invention in which the spindle is prevented from rotating. A hand-held micrometer of this type, for example, may have sharp or knife-edged measuring ends 42, 42.1 adapted to be received in grooves or the like of a workpiece. As shown in FIG. 13, the micrometer may include a stationary frame 32 and a spindle 34 moveable axially in the frame. One arm of the frame, designated 32.1, may be provided with an interior bushing 36 which is rigidly mounted in the frame arm, the spindle sliding axially through the bushing. The spindle is provided with a groove, desirably substantially V-shaped in cross-section, as in the previously described embodiments, the groove being identified as 34.1 in the drawings. A spheroidal bearing 38 of the type described above is seated within a hole 36.1 formed radially through the wall of the bushing, the hole permitting the bearing to move radially with respect to the spindle but preventing relative movement between the bushing and bearing in circumferential or axial directions. The outer surface of the bushing is provided with a recessed slot 36.2 about which is provided a resilient snap-ring 40. One free end 40.1 of the snap-ring extends over the exposed outer portion of the bearing 38 and resiliently urges the bearing radially inwardly of the spindle into contact with the walls of the groove 34.1. As in the embodiments set out above, the bearing 38 may resiliently move radially inwardly and outwardly as the spindle moves axially through the bushing, the bearing nonetheless rigidly fixing the spindle to the bushing to prevent rotation of the spindle with respect to the micrometer frame.

As shown in FIG. 13, the rearward end of the spindle is threaded, as at 34.2. The micrometer is provided with a rotatable barrel 44. The inner surface of the barrel is threaded along at least a portion of its length, the internally threaded portion of the barrel threadingly engaging the threaded rearward end 34.2 of the spindle. The barrel is prevented from moving axially of the frame by means of wear nuts and the like of conventional design (not shown) so that rotation of the barrel causes the spindle 34 to move axially with respect to the frame so that e.g., the thickness of a work piece may be measured between the edges 42, 42.1. The cooperating elements of the bushing, spindle and spheroidal bearing, of course, prevent the spindle from rotating with respect to the frame.

Figure 15:
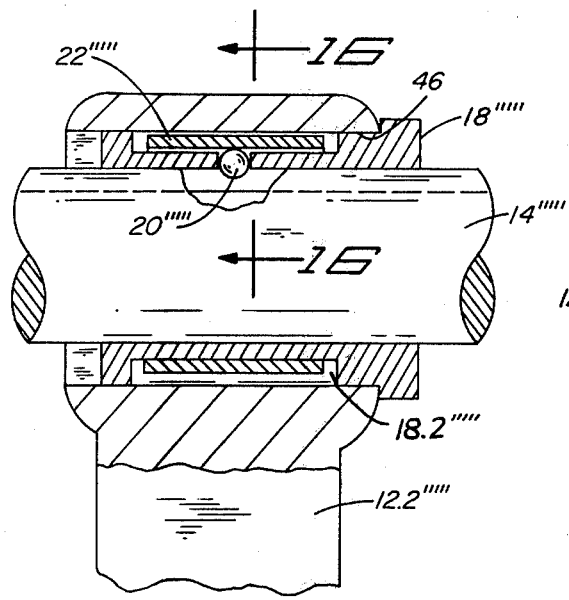
FIG. 15 is a broken-away view, in partial cross-section, showing another embodiment of the invention.
Figure 16:
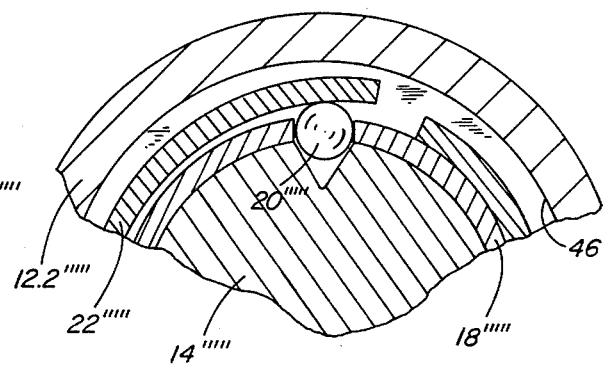
FIG. 16 is a broken-away view, in partial cross-section, taken along lines 16—16 of FIG. 15.

FIGS. 15 and 16 show another embodiment of the invention, and quintuple primed numbers designate elements similar to those previously described. This embodiment is different from that depicted in FIGS. 13 and 14 in that the resilient means is provided as a comparatively wide snap-ring 22''''' or reduced thickness which is received within the shallow, wide slot 18.2''''' formed circumferentially in the bushing 18'''''. Moreover, the bushing and snap-ring are protectively received within a bore 46 formed in the micrometer frame arm 12.2'''''. This configuration tends to protect the bushing and spheroidal bearing from damage. The bearing or bushing may be removed easily by driving the bushing out of the bore 46 (to the right in FIG. 15).

Broadly speaking, the groove in which the spheroidal bearing resiliently rides is preferably V-shaped in cross-section, with the walls of the groove being generally flat and desirably forming an angle of 60° with one another. The angle formed by the walls of the groove desirably is bisected by a radius of the spindle. It will be understood, however, that grooves of other configurations may be employed as well; for example, the walls of the groove may be slightly concave, or may meet in a rounded corner as shown at 15 in FIG. 14. The walls of the groove converge in the direction in which the spheroidal bearing is urged; e.g., radially inwardly of the spindle of the embodiment of FIGS. 2 and 3, and radially outwardly of the bushing of the embodiment of FIGS. 11 and 12. Although it is presently preferred to extend the groove parallel to the longitudinal axis (i.e., the axis of rotation) of the spindle, it is contemplated that the groove may be formed circumferentially of the spindle or bushing for some applications or that the groove may describe a helical path with respect to the longitudinal axis of the spindle.

"Spheroidal" as used herein with reference to the bearing, refers to a generally rounded surface such as the surface of a sphere. The surface need not be precisely spherical, however, but should present a rounded surface to the walls of the groove so as to provide substantially point contact between the surfaces of the bearing and the groove walls. Further, the spheroidal surface should be free of structure interfering with free contact between the spheroidal surface and the groove walls or contacting the bottom of the groove. Due to the accuracy with which ball bearings can be manufactured, ball bearings are preferred as spheroidal bearings for the purposes of the invention. The use of ball bearings greatly simplifies manufacture of micrometers of the invention, since the proper size bearing may be selected (with exemplary reference to FIGS. 2 and 3) to correctly fit a groove 14.5 which has been cut too deep or too shallow into the spindle 14 without requiring the spindle to be either scrapped or re-worked.

Figure 17:
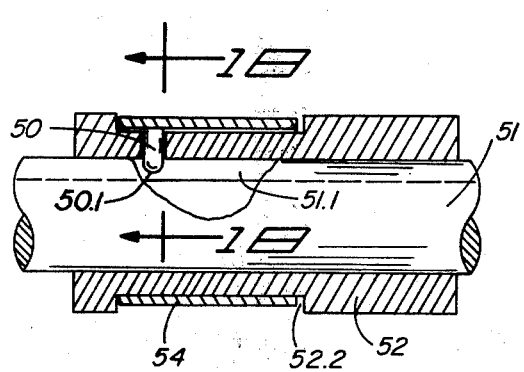
FIG. 17 is a broken-away view, in partial cross-section, of another embodiment of the invention.
Figure 18:
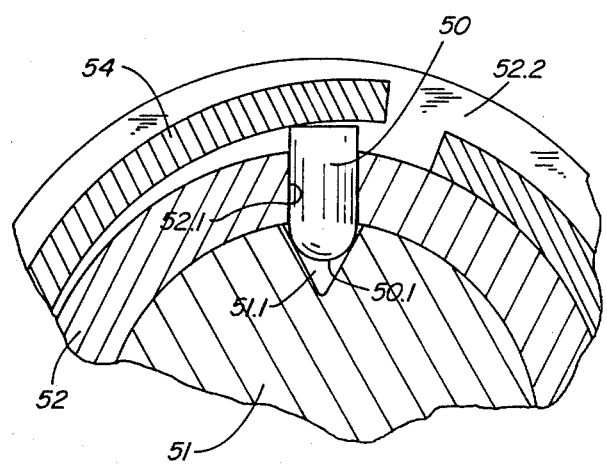
FIG. 18 is a broken-away, cross-sectional view taken along lines 18—18 of FIG. 17.

FIGS. 17 and 18 depict a micrometer of the invention in which the spheroidal bearing has the form of an elongated, cylindrical pin 50 having a spheroidal end 50.1 extending into the groove 51.1 of a spindle 51. The pin 50 extends through a hole 52.1 formed radially through the thickness of a bearing 52. A snap-ring 54, similar to that depicted as 22'''' in FIGS. 15 and 16, is received within a slot 52.2 formed in the outer surface of the bearing and urges the pin 50 radially inwardly of the spindle, thus maintaining the spheroidal surface of the pin in contact with the walls of the groove.

In the drawing, the spheroidal bearings of the various embodiments are retained within a close-fitting hole or bore which substantially prevents translational movement of the bearing other than into and out of the opposed bearing-receiving groove. Although the bearing, if in the form of a sphere, may roll in the groove, it is preferred to provide instead for sliding movement of the bearing in the groove. The pressure continuously exerted on the bearing by the resilient means (e.g., the snap-ring 22 in FIGS. 2 and 3) desirably is sufficiently great to prevent the bearing from rolling in the groove. The bearing-retaining hole or recess (e.g., 18.3 in FIGS. 2 and 3) may be sized very slightly larger than the bearing since the latter will be held at one side of the hole as the spindle is subjected to torque. For example, with hand-held micrometers employing bearings in the form of spheres, the diameter of the hole within which the bearing rides may be up to 0.001 inches greater than the diameter of the sphere. Closer fits, however, are desired.

The requirement that the spheroidal bearing be resiliently urged into the groove is a critical feature of the instant invention. The resilient urged of the bearing into the groove causes the bearing to maintain continuous contact with the walls of the groove, but yet permits the bearing some latitude of resilient movement radially of the spindle so that non-uniform groove depths, worn portions of the groove, and debris caught in the groove can be easily accomodated without binding of the bearing in the groove, thereby assuring smooth and accurate operation. This feature is diagramatically illustrated in FIGS. 8, 9 and 10. FIG. 8 illustrates the bearing "B" urged under resilient force "F" into a groove "G" having walls "W" making tangential contact with the bearing. In FIG. 8, the walls of the groove are smooth and true, and the bearing rolls or slides in the groove with contact between the bearing and the groove occurring near the intersection of the walls "W" with the outer periphery "p" of the spindle. In the event that the machining operation for forming the groove in the spindle cuts the groove too deeply, as shown in FIG. 9, the bearing "B" will still be urged by force "F" into tangential contact with the walls of the groove, the bearing in this instance settling more deeply into the groove. Thus, in a single groove of unequal depth, the bearing may vary, for example, between the position shown in FIG. 8 and the position shown in FIG. 9, but the spindle and the bushing holding the bearing "B" will nonetheless remain rigidly fixed against relative rotation. The groove "G" in FIG. 10 is depicted as having undergone a certain amount of wear due to sliding of the bearing in the groove, and indicates the manner in which the bearing merely settles more deeply in the groove but yet maintains the spindle and bushing locked against relative rotational movement.

Thus, the instant invention provides a micrometer with a means permitting smooth relative movement in one direction between a micrometer spindle and the bushing through which it moves, but which locks the spindle and bushing against relative movement in other directions. The invention substantially avoids problems associated with binding of a set screw or the like in a groove and the associated damage to delicate micrometer parts, reduces repair and simplifies manufacture.

While preferred embodiments of the invention have been described, it should be understood that various changes, adaptations, and modifications may be made therein without departing from the spirit of the invention and the scope of the appended claims.

What is claimed is:

1. In a micrometer having a bushing and a spindle extending through the bushing, the spindle and bushing having confronting surfaces:
   means for permitting movement of the spindle with respect to the bushing in a single direction and for preventing relative movement of the spindle and bushing in other directions and comprising a continuous groove in one of the confronting surfaces and extending in a single direction;
   a bearing having a spheroidal end surface and protruding from the other confronting surface to contact the spheroidal surface with walls of the groove, which walls converge away from the spheroidal bearing surface and means resiliently urging the bearing into the groove and permitting resilient movement of the bearing inwardly and outwardly of the groove while maintaining continuous contact of said spheroidal bearing surface with confronting walls of the groove.

2. The micrometer of clam 1 in which the bearing is substantially spherical.

3. The micrometer of claim 1 in which the bearing comprises an elongated pin having a spheroidal end surface in contact with walls of the groove.

4. In a micrometer having a bushing, a spindle axially moveable in the bushing, and means for advancing the spindle axially in the bushing, the spindle and bushing having mutually confronting surfaces: means permitting relative axial movement but preventing relative rotary movement between the spindle and bushing comprising an axially extending groove formed in one of the confronting surfaces, a bearing having a spheroidal surface protruding from the other confronting surface into the groove with the spheroidal surface in continuous contact with walls of the groove, which walls converge away from the spheroidal bearing surface, and means resiliently urging the spheroidal surface of the bearing into the groove and permitting radial resilient movement of the bearing with respect to the spindle while maintaining contact of said bearing with the groove walls.

5. The micrometer of claim 4 including means preventing movement of the bearing axially or circumferentially of the surface from which it protrudes.

6. In a micrometer having a bushing, a spindle axially moveable in the bushing, and means for advancing the spindle axially within the bushing:
   means permitting relative axial movement but preventing relative rotary movement between the bushing and spindle and comprising an axially extending, exterior groove formed in the spindle, a spheroidal bearing carried by the bushing and extending into and contacting walls of the groove, which walls converge away from the spheroidal bearing, and resilient means resiliently urging the bearing into the groove and permitting resilient radial movement of the bearing with respect to the spindle while maintaining continuous contact of the bearing with the groove walls.

7. The micrometer of claim 6 in which the groove is generally V-shaped in cross-section, the spheroidal bearing tangentially contacting the groove walls.

8. The micrometer of claim 7 in which the bushing includes means restraining the bearing from axial or circumferential movement with respect to the bushing.

9. the micrometer of claim 8 in which said restraining means comprises a hole formed radially through a wall of the bushing, the hole having a diameter permitting radial movement of the bearing therein but restraining movement of the bearing axially or circumferentially of the bushing.

10. The micrometer of claim 7 in which the resilient means comprises means carried by the bushing and having a bearing contacting portion urging the bearing radially inwardly of the spindle.

11. The micrometer of claim 7 including a resilient snap-ring carried exteriorly of the bushing and having a portion bearing resiliently radially inwardly upon the bearing.

12. In a micrometer having a spindle, a frame, means for axially advancing the spindle with respect to the frame, and a bushing within which the spindle is axially slideable:
   means permitting axial movement but preventing rotary movement of the bushing with respect to the spindle and comprising:
   a. a generally V-shaped groove formed in the outer surface of the spindle and extending axially thereof;
   b. a substantially spherical bearing carried by the bushing and extending into the groove in contact with walls thereof; and
   c. means resiliently urging the bearing radially into the groove and permitting limited resilient radial movement of the bearing with respect to the groove while maintaining tangential contact between the bearing and internal walls of the groove.

13. The micrometer of claim 12 in which the angle between walls of the groove is bisected by a radius of the spindle.

14. In a micrometer having a rotatable bushing, readout means responsive to rotation to the bushing, a spindle extending through the bushing, and means for axially advancing the spindle in response to rotation thereof:
   means permitting smooth axail advancement of the spindle through the bushing but preventing relative rotation between the bushing and spindle and comprising a generally V-shaped exterior groove extending axially of the spindle, a bearing having a spheroidal bearing surface projecting radially inwardly from the bushing into tangential contact with walls of the groove, means restraining the bearing from axial or circumferential movement with respect to the bushing, and means resiliently urging the bearing into the groove and permitting resilient radial movement of the bearing with respect to the spindle while maintaining continuous contact of the bearing with walls of the groove.

15. The micrometer of claim 14 in which the bearing is substantially spherical.

16. In a micrometer having a frame, a bushing fixed to the frame, a spindle slideably extending through the bushing, and means for axially advancing the spindle within the bushing:
   means permitting smooth axial advancement of the spindle through the bushing but preventing relative rotation between the bushing and spindle and comprising a generally V-shaped exterior groove extending axially of the spindle, a bearing having a spheriodal bearing surface projecting radially inwardly from the bushing into tangential contact with walls of the groove, means restraining the bearing from axial or circumferential movement with respect to the bushing, and means resiliently urging the bearing into the groove and permitting resilient radial movement of the bearing with respect to the spindle while maintaining continuous contact of the bearing with walls of the groove.

17. The micrometer of claim 16 wherein the bearing is substantially spherical.

* * * * *